Dec. 25, 1962 J. V. WERME 3,070,778
SCANNING APPARATUS
Filed May 13, 1959
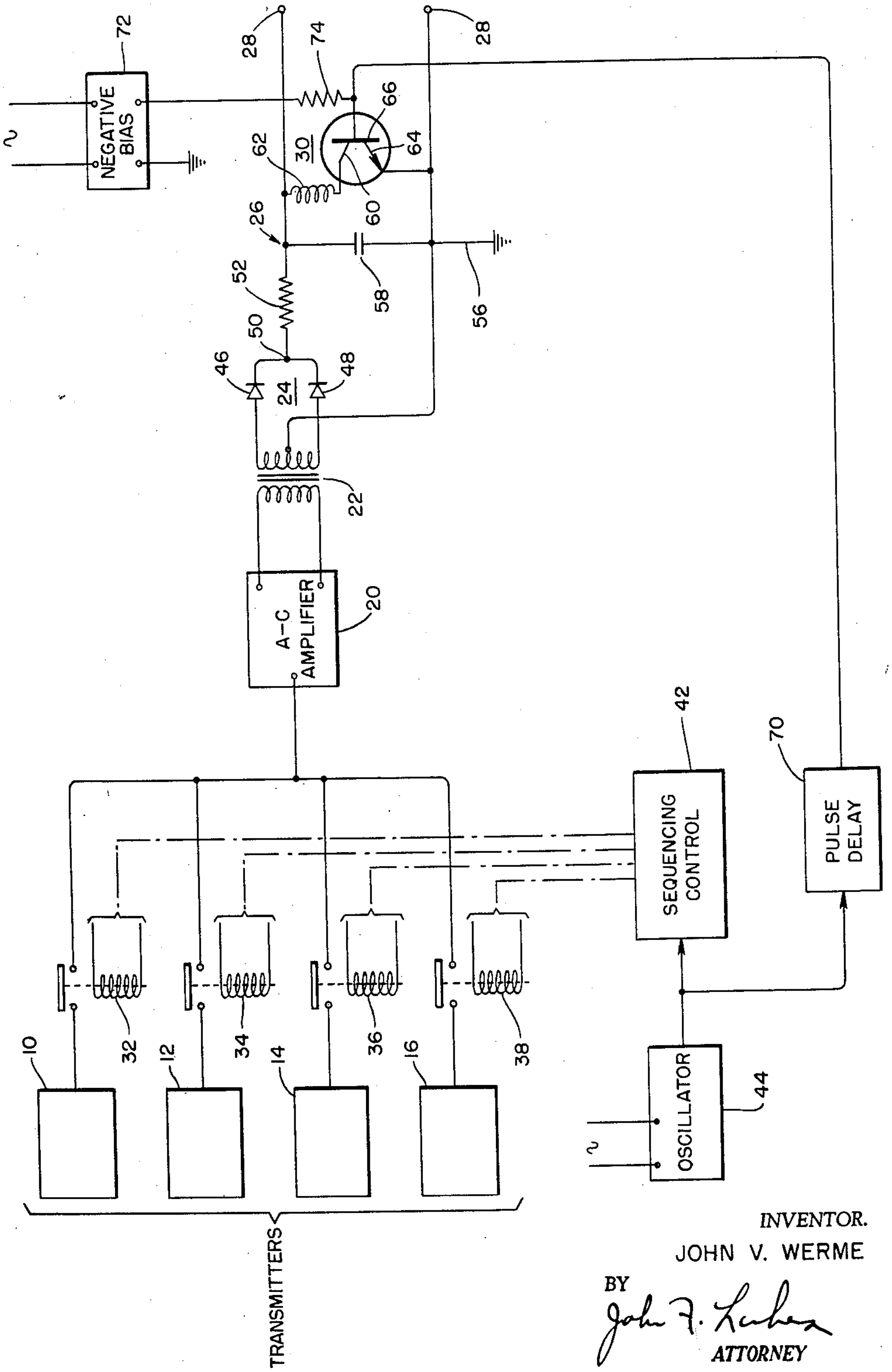
INVENTOR.
JOHN V. WERME
BY
John F. Lahey
ATTORNEY United States Patent Office 3,070,778

Patented Dec. 25, 1962

3,070,778

SCANNING APPARATUS

John V. Werme, Painesville, Ohio, assignor to Bailey Meter Company, a corporation of Delaware Filed May 13, 1959, Ser. No. 812,969
8 Claims. (Cl. 340—147)

This invention relates to scanning apparatus and more particularly to apparatus for rapidly scanning a plurality of A.-C. signals and for converting the A.-C. signals to D.-C. signals.

In many scanning and data handling systems it is necessary to convert A.-C. signals representative of the magnitudes of variables to equivalent D.-C. signals for application to analog to digital conversion circuits or other equipment. For example, a plurality of A.-C. transmitting devices may be employed to measure and establish A.-C. signals representative of a plurality of variables, and a scanner or sequencing control may be provided to sequentially connect the transmitting devices to an A.-C. to D.-C. converter, the output of which is applied to the analog or digital equipment.

In the past the speed of scanning and the accuracy of the conversion has been limited due to the nature of available conversion equipment. To effect the conversion to a direct current signal, a full wave rectifier having a resistance load and capacitance type of filter is usually provided, the filter being effective to smooth the full wave rectified signal to produce a uniform D.-C. wave having only a ripple variation in amplitude.

As is known to those skilled in the art such a capacitance type of filter has two time constants, namely a charging time constant and a discharging time constant. The charging time constant relates to the time required for the output of the filter to increase to a proportional level in response to an increase in the input signal to the converter, while the discharging time constant refers to the time required for the output of the filter to decrease to a proportional level in response to a predetermined decrease in the input to the converter.

The most desirable filter circuit for high speed scanning would have both a short charging time constant and a short discharging time constant to produce substantially instantaneous proportional changes in the filter output in response to a change in the converter input. If these time constants are long it is necessary to adjust or limit the scanning speed to take into account the delay in build up and decay of the converter output in response to application or removal respectively of an input signal.

In the past, filter circuits having short charging time constants have been readily used without difficulty, however, the use of filter circuits having short charging time constants has been limited due to accuracy considerations. If the discharging time constant is short the amplitude of the ripple is high while if this time constant is long the ripple amplitude is low.

If the ripple amplitude is large substantial variation will exist between successive measured magnitudes of the same variable due to the possibility of reading the minimum value of the ripple at one instant and the maximum value at another instant. Thus, to achieve optimum accuracy a long discharging time constant is desirable.

The long discharging time constant, however, while being advantageous from an accuracy standpoint is objectionable as mentioned above when rapid scanning is desired. When scanning a number of A.-C. transmitters having widely different magnitudes it is essential that the D.-C. output signal of the converter established by scanning of one transmitter be removed before measuring the output of the next successive transmitter to avoid false or erroneous readings. A filter with a long discharging time constant extremely limits the available scanning speed, and rapid scanning heretofore has been achieved at the expense of accuracy by using filter circuits having short discharging time constants.

I have found that the disadvantages of the above described scanning apparatus can be eliminated by providing a filter circuit having a short charging time constant and a long discharging time constant and providing means for instantaneously removing the charge of the filter capacitor after each variable A.-C. signal is scanned. Accordingly, it is a principal object of my invention to scan a plurality of variable A.-C. signals at maximum speed and with maximum accuracy employing a single A.-C. to D.-C. converter.

Another object of the invention is to provide an improved scanning apparatus particularly adapted for rapidly scanning a plurality of A.-C. signals and converting said signals to proportional D.-C. signals for application to data handling equipment.

Other objects and advantages will become apparent from the following description taken in connection with the accompanying drawing which is a schematic illustration of a scanning apparatus embodying the invention.

Referring now to the drawing, there is shown a plurality (in this case 4) of transmitting devices indicated by the reference numerals 10, 12, 14 and 16. These transmitting devices may be responsive to variables such as temperature, pressure, etc. and are effective to establish A.-C. output signals representative of the magnitudes of the variables respectively.

In general the outputs of the transmitters 10, 12, 14 and 16 are sequentially connected to an A.-C. amplifier indicated by the reference numeral 20. The output of amplifier 20 is coupled to the primary winding of a transformer 22, the secondary of which is coupled to an A.-C. to D.-C. converter comprising a full wave rectifier 24. The output of converter 24 is filtered by a filtering circuit 26 to produce a D.-C. output signal at terminals 28 having no noticeable ripple as will later be described. In accordance with the objects of my invention a means 30 is provided for removing the D.-C. signal appearing at terminals 28 following scanning of each of the transmitters.

Referring now to the specific circuitry employed, a plurality of electrical relays 32, 34, 36 and 38 are provided for sequentially connecting the outputs of the transmitters respectively to the amplifier 20. The coils of the relays are adapted to be sequentially energized in response to operation of a sequencing control 42 which is responsive to the electrical pulses generated by an oscillator 44. The sequencing control 42 is effective to energize or scan the coils of the relays 32, 34, 36 and 38 at the frequency of the pulses generated by oscillator 44 to thus sequentially apply the outputs of the transmitters to the amplifier 20.

The converter 24 is responsive to the output of amplifier 20 to establish a full wave rectified D.-C. signal proportional in magnitude to the output of the transmitter connected to the amplifier 20 at any particular instant. The circuit of rectifier 24 is basic in form comprising a pair of diode rectifier elements 46 and 48 connected to opposite ends respectively of the secondary winding of transformer 22. The common junction 50 of the diodes 46 and 48 is connected through a resistance element 52 to one output terminal 28. To complete the rectifier circuit the center tap of the secondary winding of transformer 22 is connected to ground at 56 and to the other output terminal 28. With this arrangement current will flow through the diodes 46 and 48 during alternate half cycles of the A.-C. signal to produce a full wave rectified D.-C. signal at terminal 50.

The filtering circuit 26 is formed by a capacitor 58 connected from one side of the resistance element 52 to the ground terminal 56. With this arrangement the following equation may be derived mathematically for the charging time constant $T_1$ in terms of the capacitance C of the capacitor 58, resistance $R_{52}$ of the resistance element 52, and resistance $R_L$ of a load connected to the terminals 28:

$$T_1 = \frac{R_{52} R_L}{R_{52} + R_L} C \quad (1)$$

Through a similar derivation the following equation may be produced for the discharging constant $T_2$ in terms of the same circuit elements.

$$T_2 = R_L C \quad (2)$$

If the impedance of the load connected across terminals 28 is high the term $R_L$ in the above equations will be large. Through proper selection of the values of the other terms in these equations a short charging time constant $T_1$ and a long discharging time constant $T_2$ will be achieved. The short charging time constant $T_1$ will result in substantially instantaneous build up of a potential at terminals 28 to its maximum proportional value in response to the application of an input signal to amplifier 20 eliminating any delay in the system in this respect. On the other hand, the long discharge time constant $T_2$ will produce a minimum ripple voltage thereby resulting in maximum accuracy in the scanning operation.

While the invention is not limited to any particular filter circuits, I have found that when the load resistance $R_L$ is in the range of 10 megohms a desired short charging time constant $T_1$ and long discharging time constant $T_2$ will be achieved when the terms C and $R_{52}$ in Equations 1 and 2 have the following values:

$C$—10 microfarads
$R_{52}$—100 ohms

The means 30 is effective to periodically discharge the capacitor 52 to ground at the frequency of the pulses generated by oscillator 44 to permit a maximum scanning speed to be achieved even though a filter having a long time constant is employed.

This means comprises a transistor having a collector 60 connected through a low resistance choke coil 62 to one output terminal 28. The emitter 64 of the transistor is connected to ground at 56. The base 66 is connected to the otuput of a pulse delay unit 70 which is responsive to the pulses generated by oscillator 44. To complete the circuitry a negative power supply 72 has the output thereof connected through a resistance element 74 to the base 66 of the transistor.

The transistor 30 will conduct when the collector 60 is more positive than the emitter 64 and when the base 66 has a positive bias. In the absence of any signal from the pulse delay unit 70 a negative bias for the base 66 is established by power supply 72. With this condition the transistor 30 is non-conductive and ineffective in the circuit. However, when the pulse delay unit 70 applies a positive pulse to the base 66 the net bias on the base will be positive if the voltage level of the pulse is greater than the output voltage of the power supply 72. With this condition the transistor 30 will conduct and the capacitor 58 will substantially discharge to ground.

In operation of the apparatus the oscillator 44 is arranged to generate positive pulses at a predetermined frequency and at a voltage greater than the output of power supply 72. The sequencing control is operative to sequentially energize and deenergize the relays 32, 34, 36 and 38 in response to the pulses generated by oscillator 44 to sequentially connect the outputs of transmitters 10, 12, 14 and 16 to the amplifier 20. Thus, the outputs of transmitters 10, 12, 14 and 16 are scanned at the frequency of the pulses generated by oscillator 44.

Assume now for purposes of illustration that the sequencing control 42 has just energized relay 34. Simultaneously with the energization of relay 34 the input to amplifier 20 will increase to the output voltage level of transmitter 12, and the voltage generated in the secondary winding of transformer 22 or the input to converter 24 will instantaneously increase to a proportional alternating voltage depending on the gain of amplifier 20. This alternating voltage is rectified by converter 24 to produce a full wave rectified signal at terminal 50. The filtering circuit 26 is effective to smooth this full wave rectified signal to produce a direct voltage output signal at terminals 28 having only a slight ripple variation in amplitude.

The potential at terminal 50 will follow the input to amplifier 20 and will build up instantaneously to a proportional voltage level when the output of transmitter 12 is applied to amplifier 20. The output voltage at terminal 28, however, will build up in reference to the potential at terminal 50 at a rate depending upon the charging time constant $T_1$. Since the time constant $T_1$ is short the capacitor 58 will be charged to the peak voltage of the converter 24 within a few cycles. As a result when the output of transmitter 12 is connected to the amplifier 20 the output voltage appearing at terminals 28 may be utilized substantially instantaneously.

The frequency of the oscillator 44 is such that the relay 34 will remain energized until the voltage signal appearing at terminals 28 respresentative of the output of transmitter 12 is utilized in any desired manner. As, for example, exhibiting the value of a variable, data logging, data processing or the like. The next succeeding pulse generated by oscillator 44 will through the agency of sequencing control 42 deenergize relay 34 and energize relay 36 to connect transmitter 14 to the amplifier 20. At an instant after connection of the transmitter 14 to the amplifier 20, a pulse from the pulse delay unit 70 is applied to the base 66 of transistor 30 to effect discharge of the capacitor 58 to ground in the manner previously described to insure that the charge on capacitor 58 established by transmitter 12 is removed. Thus the pulse generated by oscillator 44 to effect energization of relay 36, is also received by pulse delay unit 70 and applied at an instant later to the base 66 to effect complete discharge of the capacitor 58. This operation eliminates the need for adjusting the scanning speed to take into account the normal discharge rate of the capacitor 58 through the load connected to terminals 28, and a maximum scanning speed is achieved.

Similar operation of the system will occur as each transmitter is scanned. As will be apparent to those skilled in the art the sequencing control 42 may be arranged to continuously scan any number of transmitting devices or other sources of alternating voltage signals at any desired speed. With the circuitry disclosed this scanning speed may be maximum without affecting the accuracy of the system.

While only one embodiment of the invention has been herein shown and described, it will be apparent to those skilled in the art that many changes may be made in the arrangement and construction of the parts without departing from the scope of the invention as defined in the appended claims.

What I claim as new and desire to secure by Letters Patent of the United States:

1. In a scanning apparatus for scanning the A.-C. outputs of a plurality of devices, the combination comprising, a rectifier circuit, means for generating electrical pulses at a predetermined frequency, means responsive to said pulses for sequentially connecting the outputs of the devices to said rectifier circuit, a filter circuit including a capacitor associated with said rectifier circuit for producing a uniform D.-C. output signal proportional to the outputs of the electrical devices, a circuit element operative when conductive to discharge said capacitor to ground, a bias circuit for said circuit element effective to establish an electrical bias to render said circuit element non-conductive, and means for applying said pulses to said bias circuit to periodically reverse the polarity of said bias and render said circuit element conductive.

2. In a scanning apparatus as claimed in claim 1 wherein said rectifier circuit comprises a full wave rectifier.

3. In a scanning apparatus as claimed in claim 2 wherein said filter circuit has a short charging time constant and a long discharging time constant.

4. In a scanning apparatus as claimed in claim 3 wherein said circuit element comprises a transistor and said bias circuit is effective to apply a negative bias to said transistor to render the same non-conductive.

5. In a scanning apparatus as claimed in claim 4 wherein said polarity reversing means includes a pulse delay unit for introducing a time delay between the application of said pulses to said pulse responsive means and said bias circuit.

6. In a scanning apparatus as claimed in claim 5 wherein said means for generating electrical pulses comprises an electrical oscillator.

7. In a scanning apparatus for scanning the A.-C. outputs of a plurality of devices, the combination comprising, a single rectifier circuit, means operable to sequentially connect the outputs of the devices to said rectifier circuit at a predetermined frequency, a filter circuit connected to said rectifier circuit including a capacitor, and control means operable to periodically discharge said capacitor to ground at said predetermined frequency to insure a discharged condition of said capacitor prior to each of the outputs being sequentially connected to said rectifier circuit.

8. In a scanning apparatus for scanning the A.-C. outputs of a plurality of devices, the combination comprising, a single rectifier circuit, means operable to sequentially connect the outputs of the devices to said rectifier circuit at a predetermined frequency, a filter circuit connected to said rectifier circuit for producing a uniform direct voltage output proportional to the magnitude of the A.-C. signals, and control means operable to connect said filter circuit to ground at said predetermined frequency to insure a discharged condition of said capacitor prior to each of the outputs being sequentially connected to said rectifier circuit.

References Cited in the file of this patent

UNITED STATES PATENTS

| | | |
|---|---|---|
| 2,048,081 | Riggs | July 21, 1936 |
| 2,055,309 | Ramsey | Sept. 22, 1936 |
| 2,658,142 | St. John | Nov. 3, 1953 |
| 2,666,868 | McMillan | Jan. 19, 1954 |
| 2,771,575 | Hampton | Nov. 20, 1956 |
| 2,836,734 | Cichanowicz | May 27, 1958 |
| 2,889,510 | Carmichael | June 2, 1959 |
| 2,958,857 | Johnson et al. | Nov. 1, 1960 |

UNITED STATES PATENT OFFICE
CERTIFICATE OF CORRECTION

Patent No. 3,070,778 December 25, 1962

John V. Werme

It is hereby certified that error appears in the above numbered patent requiring correction and that the said Letters Patent should read as corrected below.

Column 1, line 52, for "charging" read -- discharging --; column 3, line 45, for "otuput" read -- output --.

Signed and sealed this 3rd day of September 1963.

(SEAL)
Attest:

ERNEST W. SWIDER
Attesting Officer

DAVID L. LADD
Commissioner of Patents